(12) United States Patent
Koda et al.

(10) Patent No.: US 6,555,046 B1
(45) Date of Patent: Apr. 29, 2003

(54) INJECTION STRETCH BLOW MOLDING METHOD

(75) Inventors: Hideaki Koda, Nagano-ken (JP); Motohiro Matsuzawa, Nagano (JP); Makoto Yoshizawa, Nagano (JP)

(73) Assignee: A.K. Technical Laboratory, Inc., Nagano (JP)

( * ) Notice: Subject to any disclaimer, the term of this patent is extended or adjusted under 35 U.S.C. 154(b) by 0 days.

(21) Appl. No.: 09/581,935

(22) PCT Filed: Oct. 19, 1999

(86) PCT No.: PCT/JP99/05767

§ 371 (c)(1),
(2), (4) Date: Jun. 19, 2000

(87) PCT Pub. No.: WO00/23252

PCT Pub. Date: Apr. 27, 2000

(30) Foreign Application Priority Data

Oct. 20, 1998 (JP) ............................... 10-298535

(51) Int. Cl.$^7$ ............................................. B29C 49/06
(52) U.S. Cl. ........................................ 264/520; 264/537
(58) Field of Search ................................ 264/520, 523, 264/537

(56) References Cited

U.S. PATENT DOCUMENTS 5,364,585 A * 11/1994 Takeuchi ..................... 264/520
5,620,650 A * 4/1997 Nakajima et al. ........... 264/520

FOREIGN PATENT DOCUMENTS

| EP | 239136 | 9/1987 |
| JP | 62-225309 | 10/1987 |
| JP | 3-26513 | 2/1991 |
| JP | 4-62135 | 2/1992 |

* cited by examiner

*Primary Examiner*—Suzanne E. McDowell
(74) *Attorney, Agent, or Firm*—Weingarten, Schurgin, Gagnebin & Lebovici LLP

(57) ABSTRACT

A required preform 2 is molded by rapidly cooling molten resin which has been injected and filled into an injection mold. The preform 2 is held by its neck portion with a neck mold and is mold-released in a high temperature state. A bottle 1 having a thin body portion 1a is molded by stretch blowing laterally and longitudinally within a blow mold. Among the thickness 2a and length 2b of a stretched portion of the preform 2 which are set according to the volume and weight and body portion thickness 1a of the bottle 1, the thickness 2a is set to be thinner than the usually set thickness. The length 2b is set to be long inversely proportional to the thickness setting. The preform 2 is mold-released at a higher temperature than usual and is stretch-blow molded before its outer surface temperature reaches its peak. By reducing the thickness of the stretched portion of the preform and, on the contrary, increasing the length thereof, it is possible to stretch blow mold a hollow molded product with a usual geometry in which the body portion thickness is below 0.2 mm, even in a hot parison method which carries out mold-release at high temperature.

1 Claim, 1 Drawing Sheet

INJECTION STRETCH BLOW MOLDING METHOD

TECHNICAL FIELD

This invention relates to an injection stretch blow molding method for molding a hollow molded product, such as a bottle, having a thin body portion by stretch blowing a preform, which has been injection molded, immediately after mold-release.

BACKGROUND ART

In stretch blow molding, there is the cold parison method, in which a preform having been injection molded is stocked, and heated and stretch blown later on by a stretch blowing apparatus; and the hot parison method in which an injection apparatus and a stretch blowing apparatus are provided in the same molding apparatus, and in which a preform having been injection molded is stretch blown while it possesses heat therein.

In both molding methods, the thickness and length of a stretched portion of the preform is set according to the volume and weight, and thickness of a body portion of a hollow molded product, such as a bottle or a wide-mouthed container, which becomes the final product. Further, according to a biaxial orientation caused by stretching in the longitudinal direction and thee radial direction, properties such as transparency and strength are enhanced. Therefore, the stretching ratio is set at as high a ratio as possible to an extent in that it is possible to obtain a thickness which maintains the functions as a hollow molded product.

The design of a preform which has conventionally been implemented is such that the stretching ratio in the longitudinal direction is set to be as large as possible by setting the thickness of a stretched portion of a preform to be thick, and, on the other hand, setting the length thereof short. However, such a preform with a thick thickness and a shortlength in the longitudinal direction has a considerable influence on the molding cycle or the molding state.

The more the thickness is increased, more time is required for cooling during preform molding in the hot parison method; and more time for preform heating is required in the old parison method. Thus, reduction in molding cycle time is impeded.

In a preform which is mold-released in a state maintaining high temperature for reducing the molding cycle, the accumulated amount of heat possessed in the inner portion thereof is proportional to the thickness. Accordingly, in a case where the thickness is thickened and the length is set shorter than before in order for the stretching ratio to be about 8 to 9 times to earn longitudinal stretching ratio, it is difficult to drop the inner temperature near glass transition temperature (Tg) by means of a cooling action according to airblow and increase in surface area caused by stretching. Therefore, a bias in thickness occurs and a satisfactory product cannot be obtained, even when the molding material is polyethylene terephthalate (PET) which-has a self-stretching characteristic.

Such a bias in thickness can be prevented by setting the longitudinal stretching ratio to be larger than before, and by dropping the preform temperature, in the final molding step by stretch molding, near glass transition temperature (Tg). However, even though such a method is applicable to molding a super-thin hollow molding product having a thickness of 0.15 mm or below with a high stretching ratio as disclosed in Japanese. Patent Laid-open Publication No. 9-94872, it is extremely difficult to apply this to a bottle having a usual geometry.

DISCLOSURE OF THE INVENTION

This invention has been contrived to solve the above-described problems, and an object is to provide a novel method which can stretch blow mold not only, needless to say, a bottle with a usual thickness, but also a hollow molded product with a usual geometry in which the thickness of its body portion is below 0.2 mm, and can reduce the molding cycle time, without forming the thickness of a stretched portion of the preform to be thick, even in the hot parison method which uses a preform having been mold-released in a state maintaining high temperature.

In order to achieve the above-described object, the present invention provides an injection stretch blow molding method characterized in that, in molding a hollow molded product having a thin body portion, such as a bottle, by molding a required preform by rapidly cooling molten resin which has been injected and filled into an injection mold, holding the preform by its neck portion with a neck mold, mold-releasing in a high temperature state in which the shape of the preform is maintained by a skin layer formed on the outer surface of the preform, and stretch blowing the preform laterally and longitudinally within a blow mold, among the thickness and length of a stretched portion of the preform which are set according to the volume and weight and body portion thickness of the hollow molded product, the thickness is set to be thinner than the usually set thickness and the length is set to be long inversely proportional to the thickness setting; and the preform is mold-released at a higher temperature than usual and is stretch-blow molded before its outer surface temperature reaches its peak.

BEST MODE FOR CARRYING OUT THE INVENTION

Figure 1:
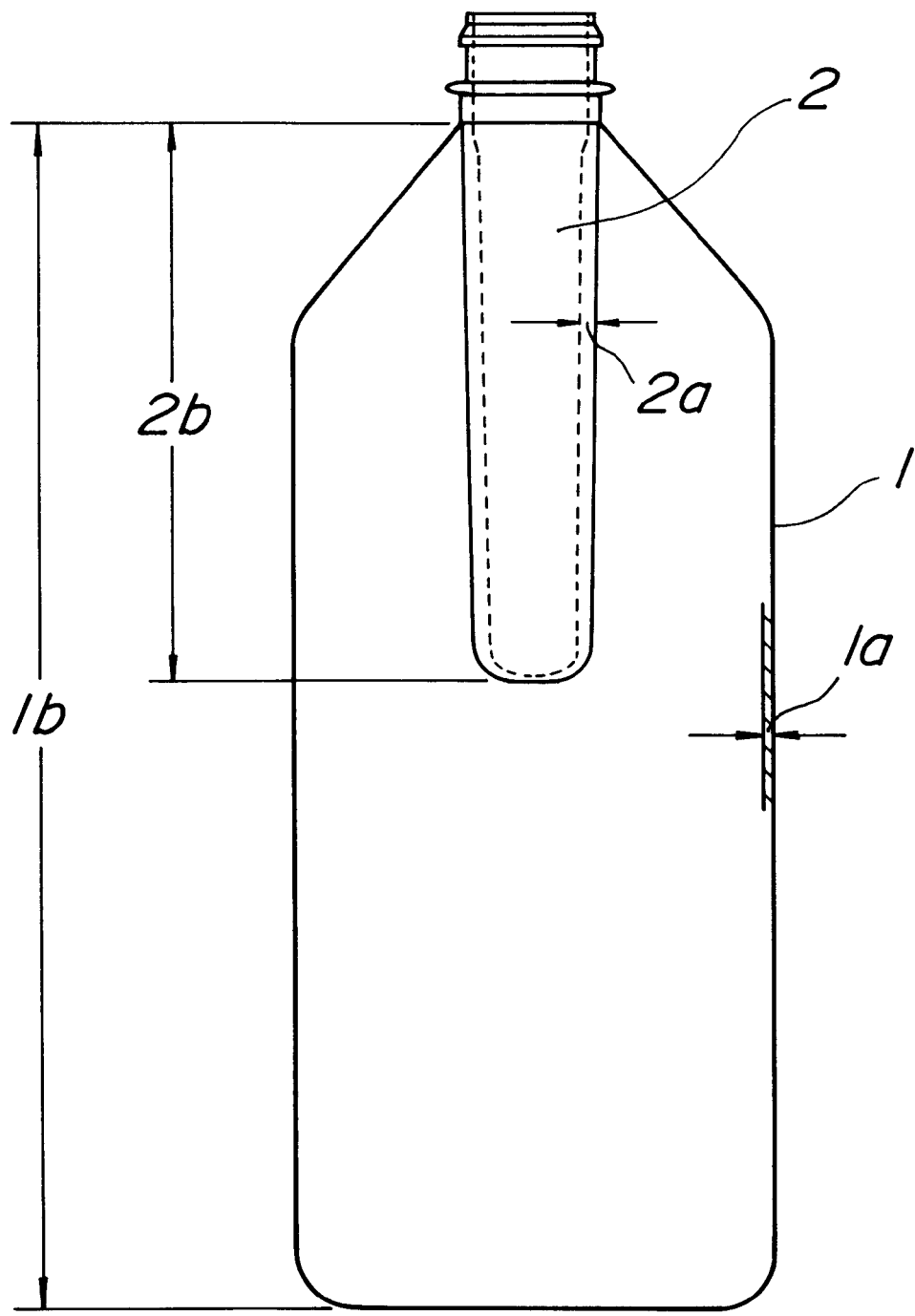
FIG. 1 is a schematic view explaining the relation between the dimension of a preform and a molded bottle in the injection stretch blow molding method according to the present invention.

Below, the present invention will be explained by exemplifying a bottle 1 in which the thickness of its body portion is 0.2 mm or below.

As shown in FIG. 1, the thickness $2a$ and length $2b$ of a stretched portion of a preform 2 is set according to the volume and weight, and a body portion thickness $1a$ of the bottle 1 to be the product. The thickness $2a$ is set to be about 40 % thinner than a usual thickness. The length $2b$ is set to be longer than usual in inverse proportion to the thickness $2a$; and longitudinal stretching ratio is decreased. However, this stretching ratio is to be in a range which maintains a ratio necessary for stretching at least a bottom surface of the preform (for example, at least about 1.4 times for a compact size product).

An injection mold and an injection core mold, produced according to the set value of the above-described preform 2, are cooled by water cooling so that their temperature is 15° C. Polyester resin in molten state, for example polyethylene terephthalate, is injected and filled from a bottom portion thereof into a cavity defined by the injection mold and the core mold which is passed through a neck mold and positioned in the injection mold. Thus, there is formed the above-described preform 2 with a bottomed cylindrical shape in which the average thickness $2a$ of the stretched portion is from 1.95 to 2.0 mm except for the neck portion and bottom portion, and the length $1b$ of the stretched portion is about 130 mm.

Related to the thickness, in the preform within the cavity immediately after starting to dwell, the cooling precedes in the thin neck portion and bottom portion. Further, on the outer and inner surfaces of the preform which contact the surface of the injection mold and the surface of the core, there is formed a skin layer caused by cooling. The inner portion of the preform is still in a high temperature state and in a molten or half-molten state; but since the thickness 2a is thin, mold-release becomes possible after a cooling time of about 1 to 1.5 seconds.

In this mold-release step, removal of the injection core precedes, and then the preform is successively removed from the cavity by the above-described neck mold which forms the neck portion of the preform.

Immediately after mold-release, the outer surface of the preform is stiffly formed because of rapid cooling, but since the inner temperature of the preform is still at a high temperature, the outer surface temperature of the preform at the time of mold-release is raised to about 104° C. Further, the outer surface temperature is raised rapidly by the heat possessed within the preform, and comes near its peak temperature (120° C.) in about 5 seconds.

The preform 2 having been mold-released is transferred into a blow mold in a state wherein the neck portion is pinched by the neckmold. Before reaching the peak temperature, in a usual manner, the preform is stretched longitudinally by 2.2 times by means of a stretching rod and is air blown to form the above-described bottle 1 with a planar stretching ratio of about 8 to 8.5. By this stretch blowing, the body portion thickness 1a of the bottle 1 comes to be around 0.17 mm, although there occurs a slight difference according to the bottle height 1b below the neck.

Apart from the above-described embodiment, the present invention is also applicable for molding a bottle having a usual geometry (40 gr in weight) with a body portion thickness of 0.25 mm. In such a case, the thickness of the stretched portion of the preform is set to be thin as 3.0 mm or below, and preferably about 2.5 mm; and on the contrary, the length is set to be longer than usual. The molding cycle is at high speed (high cycle) alike the above-described embodiment because of reduction in thickness.

EXAMPLE

| | |
|---|---|
| Material Resin | Kodak 250HB 50 |
| Molding apparatus | Injection stretch blow molding apparatus SB III-250LL50 (4 cavities, by A.K. Technical Laboratory, Inc.) |
| Bottle size | 1400 cc (27 g in weight) |
| a. Body portion diameter | 88.0 mm |
| b. Body portion thickness | 0.17 mm |
| c. Height below neck | 291.0 mm |

Preform Size

| | |
|---|---|
| a. Outer diameter of stretched portion | 23.0 mm |
| b. Stretched portion thickness | 1.95 mm |
| c. Stretched portion length | 132.0 mm |

Condition of Injection Molding Preform

| | |
|---|---|
| a. Temperature of injection cylinder | 270° C. |
| b. Injection filling time | 1.0 sec |
| c. Mold cooling temperature | 15° C. |
| d. Cooling time | 1.1 sec |

Outer Surface Temperature of Preform

| | |
|---|---|
| a. Temperature at time of mold release | 104° C. |
| b. Peak temperature | 119° C. |
| c. Peak temperature time | 5 to 6 secs. after mold release |

(Measuring device: Infrared thermal imagery device by Nippon Avionics Co., Ltd., TVS-2100MKII)

Stretch Blow Condition

| | |
|---|---|
| a. Mold temperature | 15° C. |
| b. Blow air pressure | 2.2 Mpa |

Planar Stretching Ratio of Bottle

Longitudinal stretching ratio×lateral stretching ratio=planar stretching ratio (central body portion)

2.2×3.8=8.36 times

Molding cycle 9.5 sec

Molding Condition

Almost no bias in thickness was observed, and a bottle good in transparency was obtained. Further, compared to usual molding (3.0 mm in thickness, molding cycle of 14 seconds), because of the reduction in injection filling time and cooling time, the molding cycle time was shortened by about 4.5 seconds and became high speed (high cycle).

INDUSTRIAL APPLICABILITY

According to the present invention, it is possible to provide a novel method which can stretch-blow mold not only, needless to say, a bottle with a usual thickness, but also a hollow molded product with a usual geometry in which the thickness of its body portion is below 0.2 mm, and can reduce the molding cycle time, without forming the thickness of a stretched portion of the preform to be thick, even in the hot parison method which carries out mold release at high temperature.

What is claimed is:

1. A method for injection stretch blow molding of polyethylene terephthalate (PET) characterized in that, in molding a hollow molded product having a thin body portion such as a bottle by molding a required preform by rapidly cooling molten resin of polyethylene terephthalate (PET) which has been injected and filled into an injection mold, holding the preform by its neck portion with a neck mold, mold-releasing in a high temperature state in which the shape of the preform is maintained by a skin layer formed on the outer surface of the preform, and stretch blowing the preform laterally and longitudinally within a blow mold, Among the thickness and length of a stretched portion of the preform which are set according to the volume and weight and body portion thickness of the hollow molded product, the thickness is set to be thinner than 3.0 mm and the length is set to be long inversely proportional to the thickness setting; and the preform is mold-released at about 104° C. which is a high temperature and is stretch-blow molded before its outer surface temperature reaches its peak.

* * * * *

UNITED STATES PATENT AND TRADEMARK OFFICE
CERTIFICATE OF CORRECTION

PATENT NO. : 6,555,046 B1
DATED : April 29, 2003
INVENTOR(S) : Hideaki Koda et al.

It is certified that error appears in the above-identified patent and that said Letters Patent is hereby corrected as shown below:

Column 1,
Line 28, "thee" should read -- the --.

Signed and Sealed this

Twenty-seventh Day of July, 2004

JON W. DUDAS
*Acting Director of the United States Patent and Trademark Office*